United States Patent [19]

Gaffard

[11] 4,265,539

[45] May 5, 1981

[54] DEVICE WHICH MEASURES THE MUTUAL COHERENCE FUNCTION OF A LASER BEAM

[75] Inventor: Jean-Paul Gaffard, Fontainebleau, France

[73] Assignee: Compagnie Generale d'Electricite, Paris, France

[21] Appl. No.: 46,293

[22] Filed: Jun. 7, 1979

[30] Foreign Application Priority Data

Jun. 16, 1978 [FR] France .................. 78 18058

[51] Int. Cl.³ .................... G01B 9/02
[52] U.S. Cl. .................... 356/345; 356/353; 250/550
[58] Field of Search .......... 356/345, 353; 250/550

[56] References Cited

U.S. PATENT DOCUMENTS

| 3,517,982 | 6/1970 | Fonda-Bonardi | 356/345 |
| 3,776,636 | 12/1973 | Dandliker et al. | 356/345 |

Primary Examiner—Conrad J. Clark
Attorney, Agent, or Firm—Sughrue, Rothwell, Mion, Zinn and Macpeak

[57] ABSTRACT

A device which measures the mutual coherence function of a laser beam. The device includes: a screen 1 in which openings 3 to 11 are disposed on the path of the beam 2 and allow pencils of light 19, 29 and 34 to pass; an interferometer constituted by an optical plate 13, a dihedron 14 and a mirror 21; a phase modulator 22 disposed on a branch of the interferometer; receivers 23 to 27 which receive the pencils of light 20 and 33 which emerge from the interferometer; and a processing circuit 36. Application to the analysis of a laser beam.

4 Claims, 2 Drawing Figures

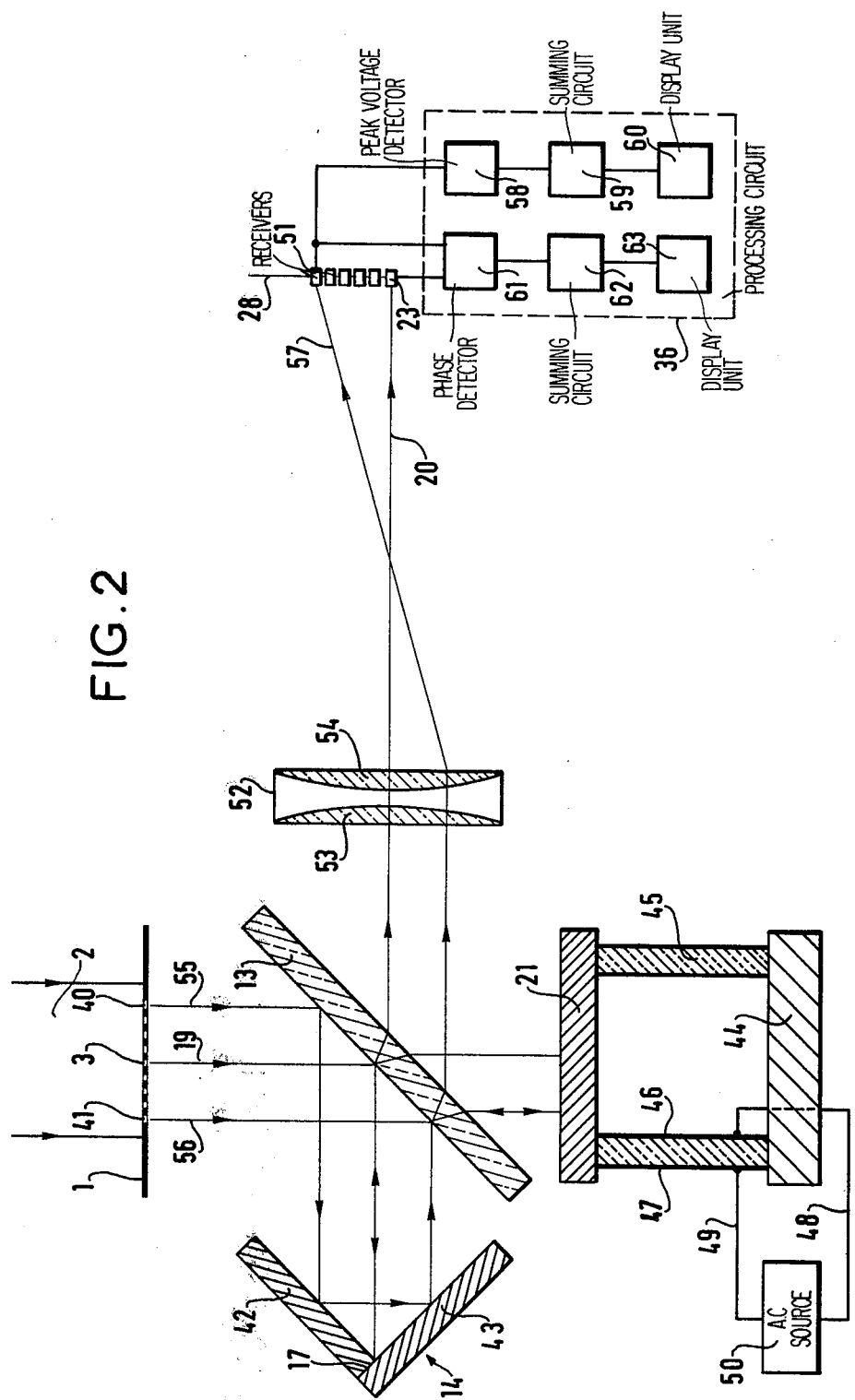

DEVICE WHICH MEASURES THE MUTUAL COHERENCE FUNCTION OF A LASER BEAM

FIELD OF THE INVENTION

The present invention relates to a device which measures the mutual coherence function of a laser beam.

BACKGROUND OF THE INVENTION

It is known that the coherence of a laser beam is currently evaluated by measuring the proportion of energy of the beam which is inside a cone whose apex angle is called the angle of divergence.

But this measurement takes into account only the spatial divergence of the beam and it appears insufficient to study in particular the propagation of a laser beam.

A mutual coherence function of a laser beam has therefore been defined, said function characterizing in particular the time coherence of the beam, i.e. the perturbations and the fluctuations of the phase of the laser wave. This definition is set forth in chapter 10, paragraph 3, pages 499 to 505 of the book "Principles of Optics" By Max Born and Emil Wolf (published by Pergamon in 1964—Second revised edition).

The present invention aims to measure the time coherence of a laser beam.

SUMMARY OF THE INVENTION

The present invention provides a device which measures the mutual coherence function of a laser beam. The device includes a plane screen constituted by a material which is able to block the energy of the laser beam. The screen being disposed perpendicular to the axis of the beam and having $2n+1$ openings so as to pass $2n+1$ pencils of laser light taken from the beam, the openings being disposed along a straight line of said screen and including a central opening, a first group of n openings situated to one side of the central opening and a second group of n openings disposed on the other side of the central opening symmetrically in relation to the central opening, n being an integer.

A partially reflecting optical plate is disposed so as to allow a fraction of the energy of each pencil of light to pass and so as to reflect the other fraction of the energy of each pencil of light at 90 degrees parallel to said straight line.

A rectangular dihedron is provided whose opposite inner surfaces are reflecting surfaces. A first surface and the second surface of the dihedron are respectively parallel and perpendicular to the plane of the optical plate so that the edge of the dihedron is perpendicular to said straight line. The reflecting surfaces of the dihedron are disposed to receive the pencils of light which are reflected by the optical plate. The pencil of light which emerges from the central opening reaches the edge of the dihedron and is returned on its own path so that part of its energy passes through the plate to form a reference pencil of light.

A plane mirror is disposed to return on its own path said fraction of energy of the pencils of light which have passed through the optical plate.

A modulator for modulating the phase of said fraction of energy of the pencils of light is situated on the path of the pencils of light after passing through the optical plate.

$n+1$ photoelectric receivers which include a reference receiver are disposed to receive the reference pencil of light and n measuring receivers are disposed to receive respectively the n pencils of light which emerge from the openings of the first group after they have been successively reflected on the optical plate, the first surface and the second surface of the dihedron and after they have subsequently passed through the optical plate, the n pencils of light being respectively superposed on the n pencils of light which emerge from the openings of the second group having passed through the optical plate then having been reflected successively on the plane mirror and on the optical plate.

A processing circuit is provided which is able to determine, over a predetermined time, the average values of the amplitude of the signals delivered by each of the n measuring receivers and over said predetermined time the average values of the phase difference between the signals delivered by each of the n measuring receivers and the signal delivered by the reference receiver. These average amplitude values and average phase values are representative of the amplitude and of the phase of the mutual coherence function relating to the points of the cross-section of the laser beam which correspond to the openings of the screen.

Particular embodiments of the present invention are described hereinbelow by way of example, with reference to the accompanying drawings.

BRIEF DESCRIPTION OF THE FIGURES

FIG. 2 illustrates a cross-section of a preferred embodiment of the device in accordance with the invention.

DESCRIPTION OF PREFERRED EMBODIMENTS

Figure 1:
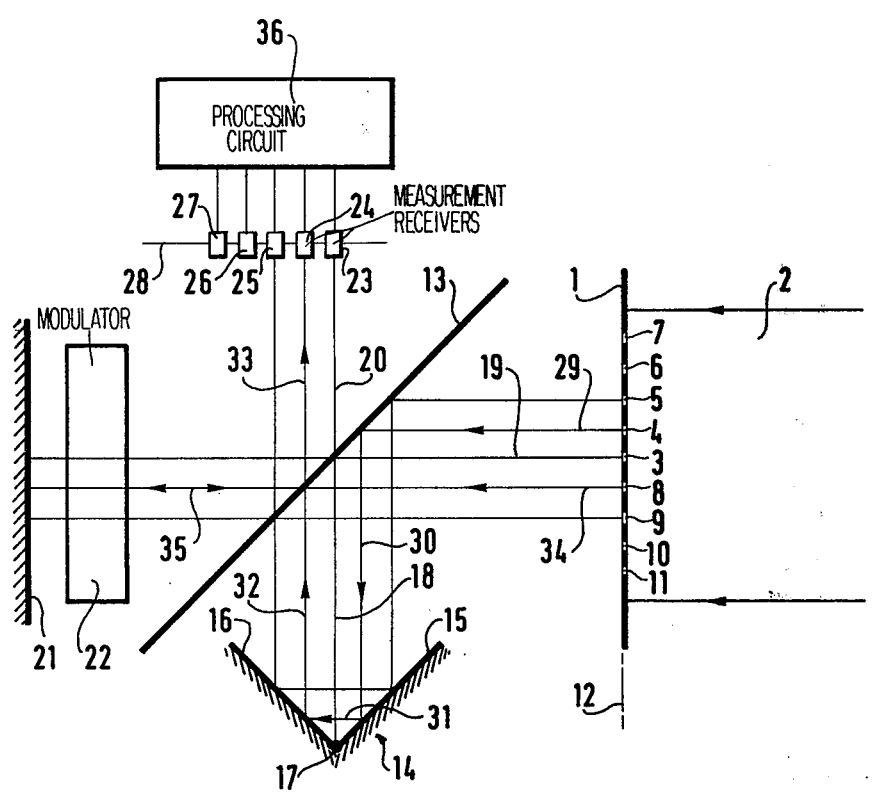
FIG. 1 schematically an embodiment of the device in accordance with the invention.

The mutual coherence function of a laser beam is defined by the equation:

$$\overline{\Gamma(\vec{p},\tau) = E(\vec{r},t).E^*(\vec{r}+\vec{p},t+\tau)} \qquad (1)$$

where $.E(\vec{r},t)$ is the electric field at the instant t at a point M of the cross-section of the beam through a plane perpendicular to its propagation axis, the point M being defined by a vector $\vec{r}$ which comes from a point of origin of the plane, $E(r,t)$ being represented in the complex plane by an equation of the form $$E(\vec{r},t) = a(\vec{r},\nu)\exp[j2\pi\nu t + \phi(r)]$$

in which:
a is the amplitude of the electric field;
$\nu$ is the frequency of the laser wave;
$\phi$ is the phase of the laser wave;
$J = \sqrt{-1}$
$.E^*(\vec{r}+\vec{p})$ is the imaginary conjugate electric field in the complex plane, at the instant $t+\tau$, at a point M' of the cross-section of the beam, point M' being defined by the vector sum $\vec{r}+\vec{p}$.
the upper bar over the product $\overline{E.E^*}$ indicates that the average of the product is taken over a predetermined period.

It is known that the mutual coherence function demonstrates the ability for there to be interference between the elementary light waves which come from the points M and M' of the cross-section of the beam, which two points can occupy all the possible positions in the cross-section of the beam.

In FIG. 1, a plane screen 1 is disposed in a right cross-section of a laser beam 2 whose mutual coherence function is to be measured. The screen is constituted by a material which is capable of blocking the energy of the beam 2. It has, for example, nine openings aligned on a straight line 12 of the plane of the screen. These openings include a central opening 3, a first group of four openings 4,5,6 and 7 situated on one side of the opening 3 and a second group of four openings 8, 9, 10 and 11 situated on the other side of the opening 3; the openings of the first group and of the second group being disposed symmetrically in relation to the central opening 3. For example, the opening 8 is symmetrical to the opening 4 and the opening 9 is symmetrical to the opening 5. In practice, the openings can be equidistant, as illustrated.

The screen 1 allows nine narrow elementary beams taken from the beam 2 to pass through its openings, the elementary beams being referred to as pencils of light in the following part of the text.

A partially reflecting optical plate 13 is disposed on the path of the pencils of light so as to allow a fraction of the energy of each pencil of light to pass and the other fraction to be reflected through 90 degrees to be parallel to the straight line 12.

A dihedron 14 in the form of a right prism which has two opposite inner reflecting surfaces 15 and 16 is disposed to receive the pencils of light reflected by the plate 13 on these surfaces 15 and 16. The surface 15 is parallel to the plane of the plate 13 and the surface 16 is perpendicular to that plane so that the edge 17 of the prism is perpendicular to the line 12. Further, the prism is disposed so that the pencil of light 18 which results from the reflection on the plate 13 of the pencil of light 19 which comes from the central opening 3, reaches the edge 17 of the prism and is returned on its own path in the opposite direction, so that part of the energy returned passes through the plate 13 to form a reference pencil of light 20.

A plane mirror 21 is disposed so as to reflect the fraction 35 of energy of the pencils of light such as 19 which pass through the optical plate 13 so that it returns back along the same paths.

A modulator 22 is disposed on the path of the fraction of energy between the mirror 21 and the plate 13 to modulate the phase of that fraction of energy.

Five photoelectric receivers 23, 24, 25, 26 and 27 are aligned along a straight line 28 substantially parallel to the direction of the pencils of light such as 19 which emerge from the openings in the screen 1. The reference receiver 23 is disposed to receive the reference pencil of light 20. The measurement receivers 24 to 27 are disposed to receive respectively the four pencils of light which come from the openings of the first group 4 to 7 after they have been reflected successively on the optical plate 13, the surface 15 and the surface 16 of the prism 14 and after they have passed through the optical plate 13. The four pencils of light are respectively superposed on the four pencils of light which comes from the openings of the second group 8 to 11 which has passed through optical plate 13 and which has then been reflected successively on the mirror 21 and the optical plate 13.

Thus, for example, the pencil of light 29 which comes from the opening 4 is reflected by the plate 13 in a pencil of light 30 which is itself reflected by the surface 15 of the prism 14 into a pencil of light 31 which is reflected by the surface 16 of the prism 14 into a pencil of light 32 which, after passing through the plate 13, reaches the measuring receiver 24 in a pencil of light 33. Further, the pencil of light 34 which emerges from the opening 8 which is symmetrical to the opening 4 in relation to the central opening 3, passes through the plate 13 in a pencil of light 35 which is reflected back along its own path by the mirror 21 to be reflected on the plate 13 so as to be superposed on the beam 33.

The electric outputs of the receivers 23 to 27 are connected to a processing circuit 36.

The device described hereinabove and illustrated in FIG. 1 operates as follows.

The opening 3 of the screen 1 is preferentially disposed on the axis of the laser beam 2 so that the various openings of the screen 1 are aligned around a diameter of the cross-section of the beam 2 through the plane of the screen 1.

Due to the optical system constituted by the plate 13, the prism 14 and the mirror 21, the pencils of light which emerges from the openings of the first group follow firstly an optical path which is different from the path followed by the pencils of light which emerge from the openings of the second group, then the pencils of light are superposed in pairs as set forth hereinabove. Before superposition, the modulator 22 modulates the phase of the pencils of light which emerge from the openings of the second group. Preferably, the phase is modulated over a quarter of the wavelength of the laser radiation. Modulation is periodic and its angular frequency is $\Omega$. The optical system therefore tends to cause interference on the measuring receivers 24 to 27.

The processing circuit 36 is capable of determining firstly the average values over a predetermined period of the amplitude of the signals delivered by each of the four measuring receivers and secondly the average values over the predetermined period of the differences in phase between the signals delivered by each of the four measuring receivers and the signal delivered by the reference receiver. The predetermined period over which the average of the signals is measured is, of course, longer than the response time of the detector and than the modulation period. Therefore, an amplitude signal and a phase signal is obtained for each measuring detector, i.e. for each pair of symmetrical openings of the first and second groups, such as a pair 4-8 or the pair 5-9. The amplitude and phase signals are respectively representative of the amplitude and the phase of the mutual coherence function of the laser beam.

This result is explained by the fact that if the signal received by the measuring detector is designated as $W_{ik}$, i.e. the signal which results from the superposition of two pencils of light which emerge from two symmetrical openings i and k of the screen, we have $$W_{ik} = E_i^2 + E_k^2 + 2E_iE_k \cos(\Omega t + \phi_i - \phi_k) \qquad (2)$$

It appears that if the average of the last term of equation 2 is taken, we find the modulus and the phase of the mutual coherence function such as defined hereinabove in equation 1.

The device described hereinabove therefore makes it possible to associate two values which correspond respectively to the amplitude and the phase of the coherence function at various points situated on a diameter of a cross-section of a laser beam.

If the assembly formed by the device is made to rotate by a predetermined angle about the axis of the laser beam, it is possible to make measurements at points situated on another diameter of the beam.

It is therefore possible, so to speak, to chart the values of the mutual coherence function for a plurality of points distributed on the cross-section in question of the laser beam.

FIG. 2 illustrates a preferred embodiment of the device in accordance with the invention. The figure illustrates the screen 1 disposed perpendicularly to the path of the beam 2 and having eleven aligned openings such as the central opening 3 and the openings 40 and 41 at opposite ends.

The plate 13 is a glass plate on one of whose surfaces dielectric layers have been deposited so as to cause partial reflection of the energy of the light beam.

The dihedron 14 is formed by fixing together two plane mirrors 42 and 43 at 90° to each other.

The mirror 21 is fixed on a stand 44 by means of a tube 45 of piezo-electric ceramics. Two metal layers 46 and 47 are deposited on the inner and outer cylindrical surfaces of the tube 45. These layers constitute electrodes connected by connections 48 and 49 to the two poles of a source 50 of alternating current whose angular frequency is $\Omega$. The ceramics tube 45 fitted with its electrodes constitutes a vibrating pot which vibrates the mirror 21 in the direction of propagation of the pencils of light which are reflection on it and consequently modulates the phase of the light radiation. The phase can be modulated for example over an interval whose wavelength is $\pm \lambda/4$, $\lambda$ being the wavelength of the laser beam.

The receivers are constituted by a strip of photodiodes aligned along the axis 28. The strip includes the reference receiver 23 and measuring receivers such as the end receiver 51.

Between the plate 13 and the receivers, the device illustrated in FIG. 2 further includes an optical system which can be a condenser 52 formed by two lenses 53 and 54. The condenser forms the image of the various openings of the screen respectively on the various photodiodes of the strip. This forms an optical correspondence between the openings and the receivers—a correspondence which avoids loss of energy by diffusion.

FIG. 2 illustrates the pencil of light 19 which emerges from the central opening 3 and which, after reflection on the plate 13, reaches the edge 17 of the 90° mirrors 14 and is returned on its own path and passes through the optical plate 13 to constitute the reference pencil of light 20 and to form an image of the opening 3 on the reference receiver 23. Likewise, the pencil of light 55 which emerges from the end opening 40 is reflected successively on the plate 13, the mirror 42 and the mirror 43 and passes through the plate 13 and the optical system 52 to form an image of the opening 40 on the end receiver 51 of the strip of photodiodes. The image is superposed on that of the opening 41 through which a pencil of light 56 passes through the plate 13, is returned on its own path by the mirror 21 onto the receiver 51 in an pencil of light 57.

The processing circuit 36 includes in particular a peak voltage detector 58 whose input is connected to the electric output of the measuring receiver 51 and whose output is connected to the input of a summing circuit 59 whose output is able to deliver the signal representative of the average of the signals which it receives. The output of the circuit 59 is connected to a display unit 60.

The circuit further includes a phase detector 61 whose two inputs are connected respectively to the output of the measuring receiver 51 and to the output of the reference receiver 23. The output of the phase detector 61 is connected to the input of a summing circuit 62 whose output is able to deliver a signal representative of the average of the signals which it receives. The output of the circuit 62 is connected to the input of a display unit 63.

Of course, the processing circuit 36 further includes four other chains of circuits, not shown, which correspond respectively to the four other measuring receivers, these chains being identical to the chain of the circuits 58 to 63 illustrated in the figure.

The operation of the device illustrated in FIG. 2 is identical to that of the figure illustrated in FIG. 1.

The device according to the invention can be applied in particular to analysing high-power laser beams, the knowledge of the mutual coherence function being useful for studying the propagation of the energy of a laser beam.

I claim:

1. A device for measuring the mutual coherence function of a laser beam, said device including:

a plane screen constituted by a material capable of blocking the energy of the laser beam, said screen being disposed perpendicular to the axis of the beam and having $2n+1$ openings so as to pass $2n+1$ pencils of laser light taken from the beam, said openings being disposed along a straight line of said screen and including a central opening, a first group of n openings situated to one side of the central opening and a second group of n openings disposed on the other side of the central opening symmetrically in relation to the central opening, n being an integer;

a partially reflecting optical plate disposed to pass a fraction of the energy of each pencil of light therethrough and to reflect the other fraction of the energy of each pencil of light at 90 degrees parallel to said straight line;

a rectangular dihedron having opposed inner reflecting surfaces, said surfaces comprising a first surface and a second surface respectively parallel and perpendicular to the plane of the optical plate with the edge of the dihedron being perpendicular to said straight line, the reflecting surfaces of the dihedron being disposed to receive the pencils of light which are reflected by the optical plate, the pencil of light which emerges from the central opening reaching the edge of the dihedron and being returned on its own path so that part of its energy passes through the plate to form a reference pencil of light;

a plane mirror disposed to return on its own path said fraction of energy of the pencils of light which has passed through the optical plate;

a modulator for modulating the phase of said fraction of energy of the pencils of light, said modulator being situated on the path of the pencils of light after passing through the optical plate;

$n+1$ photoelectric receivers including a reference receiver disposed to receive the reference pencil of light and n measuring receivers disposed to receive respectively the n pencils of light which emerge from the openings of the first group after they have been successively reflected on the optical plate, said first surface and said second surface of the dihedron and after they have subsequently passed through the optical plate with the n pencils of light being respectively superposed on the n pencils of light which emerge from the openings of the second group having passed through the optical plate then having been reflected successively on the plane mirror and on the optical plate; and a processing circuit for determining over a predetermined time the amplitude of the signals delivered by each of the n measuring receivers and over said predetermined time the average values of the phase difference between the signals delivered by each of the n measuring receivers and the signal delivered by the reference receiver, whereby these average amplitude values and average phase values are representative of the amplitude and of the phase of the mutual coherence function relating to the points of the cross-section of the laser beam which correspond to the openings of the screen.

2. A device according to claim 1, wherein said processing circuit comprises:

n peak voltage detectors, each of said detectors having an input connected to the output of a measuring receiver;

n phase detectors, each of these detectors having two inputs connected firstly to the output of a measuring receiver and secondly to the output of the reference detector;

n first summing circuits, the input of each of said circuits being connected to the output of a peak voltage detector, said first summing circuits acting to deliver respective signals which are representative, over said predetermined time, of the average of the signals which they receive from the peak voltage detectors, and wherein the signals delivered by the n first summing circuits are representative of the amplitude of the mutual coherence function; and n second summing circuits, the input of each of said second summing circuits being connected to the output of a phase detector, said second summing circuits acting to deliver signals which are representative, over said predetermined time, of the signals which they receive from the phase detectors, and wherein the signals delivered by the n second summing circuits being representative of the phase of the mutual coherence function.

3. A device according to claim 1, wherein the phase modulator is constituted by a piezoelectric unit for causing said plane mirror to vibrate in the direction of the propagation of the pencils of laser light which it receives.

4. A device according to claim 1, further including an optical system disposed between the optical plate and the photoelectric receivers, the optical system being able to form images of the openings of the screen respectively on each of the detectors.

* * * * *